(12) United States Patent
Gosior et al.

(10) Patent No.: US 6,294,285 B1
(45) Date of Patent: Sep. 25, 2001

(54) QUICK CHANGE BATTERY SYSTEM

(75) Inventors: Jason Gosior; Kip Hampson, both of Edmonton (CA)

(73) Assignee: Eleven Engineering Inc., Edmonton (CA)

( * ) Notice: Subject to any disclaimer, the term of this patent is extended or adjusted under 35 U.S.C. 154(b) by 0 days.

(21) Appl. No.: 09/206,840

(22) Filed: Dec. 7, 1998

(51) Int. Cl.⁷ ........................................ H01M 2/10
(52) U.S. Cl. .................................................. 429/96
(58) Field of Search ................... 429/96, 97, 98, 429/99, 100

(56) References Cited

U.S. PATENT DOCUMENTS

| | | | |
|---|---|---|---|
| 5,369,802 | * | 11/1994 | Murray . |
| 5,415,947 | * | 5/1995 | Mitsui et al. . |
| 5,532,080 | * | 7/1996 | Mizoguchi et al. . |
| 5,764,477 | * | 6/1998 | Ohgami et al. . |
| 5,863,218 | * | 1/1999 | Quat et al. . |

* cited by examiner

*Primary Examiner*—Carol Chaney
*Assistant Examiner*—Susy Tsang
(74) *Attorney, Agent, or Firm*—Alan J. Atkinson

(57) ABSTRACT

A portable, battery operated electronic device for facilitating battery exchange. The electronic device housing has an opening for containing the battery. The opening has first and second apertures for permitting the battery to be pushed directly into contact with a retainer. Access to the battery is unobstructed to expedite battery exchange and to permit movement of the battery in different directions through the housing opening. The method of the invention permits quick exchange of batteries so that continuous operation of the electronic device is not encumbered. By sliding the battery against electrical contacts within the opening, the contacts are automatically cleaned during battery replacement. Visual contact with the battery permits continuous display of battery charge strips attached to the battery exterior case.

10 Claims, 1 Drawing Sheet

QUICK CHANGE BATTERY SYSTEM

BACKGROUND OF THE INVENTION

The invention described herein relates to the field of battery operated devices such as electronic controllers. More particularly, the invention relates to an apparatus and method for permitting unobstructed access to batteries in electronic devices to facilitate the quick replacement of a discharged battery.

Small, portable batteries provide electric power to portable electronic and electrical devices such as radios, lap top computers, car alarms, garage door openers, smoke alarms, telephones, pagers, television and video controllers, electronic game controllers, and other devices. Batteries are typically contained within a compartment or chamber covered by a moveable door or panel. Such doors prevent batteries from being displaced from electrical contacts and prevent dirt from entering the battery compartment.

Certain accessory uses such as game controllers, portable radios, music players, and other devices provide continuous play over long time periods. For electronic game controllers, players sometimes engage in games which extend beyond the useful life of a battery. To provide communication between a controller and receiver base unit, cumbersome power and control cables connect the game controller to the receiver base unit. Such cables limit player mobility and present hazards to children and other persons.

Portable controllers can be provided which communicate through infrared signals between the controller and the receiver base unit, however the utility of such controllers is limited by available battery power. An electronic game player may be engrossed in a personal record high scoring game at the moment that battery power is discharged, thereby disrupting the game at the crucial moment as the battery is replaced.

Conventional battery storage systems encumber a person's ability to exchange a discharged battery with a charged replacement battery. In most systems, a door or panel must be removed so that the batteries can be removed from the housing cavity. Representative examples of battery storage compartments and covers are found in U.S. Pat. No. 4,129,688 to Fisher (1978) and U.S. Pat. No. 4,166,359 to Domokos (1977) which disclosed watch housing covers for creating a waterproof compartment. U. S. Pat. No. 4,182,020 to Malloy (1980) also disclosed a waterproof cover for sealing a battery within a watch housing. U.S. Pat. No. 5,010,532 to Perrot (1991) disclosed a watch opening and cover for closing a battery housing, and U.S. Pat. No. 5,645,954 to Tamuru (1997) disclosed a moveable terminal connected to a battery compartment cover.

Although different techniques have been developed to remove discharged batteries from compartments, significant dexterity is often required to extricate such batteries. In one technique, flexible pull tabs or ribbons are positioned below the battery and one end of the ribbon is connected to the housing and the other ribbon end extends exterior of the battery. The free ribbon end is pulled to dislodge the battery, and insertion of the replacement battery pushes the ribbon back into the compartment. Flat bladed tools can be inserted between batteries and the case housing to pry the battery from the compartment. Another technique uses a special gripping tool to engage and to remove the battery. Representative examples are shown in U.S. Pat. No. 4,138,531 to Thompson (1979) which disclosed a technique for manually lifting a battery from a battery holder and in U.S. Pat. No. 5,617,079 to Harrison (1997) which disclosed an elongated rod and carriage for inserting and removing a battery from a device.

When compartments doors are used, various systems have been developed to latch the compartment door. U.S. Pat. No. 4,371,594 to Ohara et al. (1983) disclosed a lock for a battery compartment door, U. S. Pat. No. 5,337,215 to Sunderland et al. (1994) disclosed a pivoting battery compartment and door, and U.S. Pat. No. 5,722,705 to Deguchi (1998) disclosed a lock structure for a battery compartment cover. U.S. Pat. No. 4,904,549 to Goodwin et al. (1990) disclosed a latch for releasing a battery from a locked position relative to a battery housing.

An improved battery compartment door system for a battery operated pager was disclosed in U.S. Pat. No. 5,369,802 to Murray (1994). The discharged battery was changed by pushing a replacement battery against an entrance door and into contact with the discharged battery. An exit battery door was opened for the discharged battery as the replacement battery opened the entrance door. Operation of the doors was automatic during battery insertion into the battery compartment.

In addition to battery compartments having moveable doors and covers, removable, rechargeable battery packs and latching systems have been developed to facilitate battery replacement. U.S. Pat. No. 4,191,917 to Brown et al. (1978) disclosed such a rechargeable battery pack. U. S. Pat. No. 4,191,917 to Brown et al. (1980) also disclosed a replaceable battery pack. U.S. Pat. No. 3,999,110 to Ramstrom et al. (1975), U.S. Pat. No. 4,146,682 to Nakao (1979), U.S. Pat. No. 5,213,913 to Anthony et al. (1993), U.S. Pat. No. 5,401,592 to Gilpin et al. (1993), and U.S. Pat. No, 4,871,629 to Bunyea (1989) disclosed latching systems for a battery pack. U.S. Pat. No. 5,573,870 to Andrews (1996) disclosed a quick change battery pack assembly. U.S. Pat. No. 5,637,417 to Engmark et al. (1997) disclosed a push button operated release for a spring loaded battery pack, and U.S. Pat. No. 5,786,106 to Armani (1998) disclosed a battery replacement cartridge.

When a replacement battery is exchanged for a discharged battery, different systems have been developed to prevent loss of power to the attached electronic components. U.S. Pat. No. 5,148,042 to Nakazoe (1992) disclosed an electronic device locking device for releasably locking batteries. U.S. Pat. No. 5,712,553 to Hallberg (1998) disclosed a battery power supply transposition circuit. U.S. Pat. No. 5,832,282 (1998) and 5,579,491 to Jeffries et al. (1994) disclosed systems for implementing battery hot swapping in portable computers, and U.S. Pat. Nos. 5,028,806 to Stewart et al. (1989) and to Stewart et al. (1991) disclosed circuitry for switching between batteries in a portable computer. U.S. Pat. No. 4,648,066 to Pitt (1987) disclosed a module and special battery connector permitting battery replacement without loss of stored data.

Although a significant amount of effort has been dedicated to improving techniques for storing and replacing batteries in portable electronic devices, such devices require manual door operation or cartridge latching systems which delay battery replacement operations and increase the expense of the electronic device. Complicated door mechanisms are subject to malfunction and breakage and are undesirable for continuous operation devices such as game controllers. Accordingly, a need exists for an improved battery replacement and storage device which permits rapid battery replacement with minimal disruption to operation.

SUMMARY OF THE INVENTION

The invention provides a method and apparatus for permitting replacement of a battery having positive and negative terminals. The apparatus comprises a housing and an opening in said housing having a first aperture and a second aperture sufficiently large to permit movement of the battery therethrough. A retainer means is engaged with the housing for holding the battery in a selected position relative to the opening, and the battery is accessible through the opening for permitting displacement of the battery from the opening.

In different embodiments of the invention, the retaining means can comprise electrical contacts for engagement with the battery positive and negative terminals, and the battery can be completely contained within the housing opening. The electrical contacts can be engaged with electronic components, and a battery can be placed within a cartridge for insertion into the housing opening.

The method of the invention is practiced by placing a battery proximate to a first aperture of a housing opening having first and second apertures sufficiently large to permit movement of the battery therethrough, of moving the battery into contact with retainer means engaged with said housing for holding the battery in a selected position relative to the electrical contacts so that the positive and negative terminals of the battery are engaged with the electrical contacts and so that access to the battery through the first and second apertures is unobstructed, and of displacing the battery from the opening through the second aperture. In different embodiments of the method, the battery can be displaced from the opening by moving a second battery through the opening, and the electrical contacts are cleaned by moving the battery through the opening.

DESCRIPTION OF THE PREFERRED EMBODIMENTS

Figure 1:
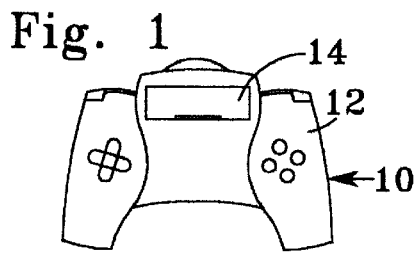
FIG. 1 illustrates a portable controller having an opening for containing a battery.
Figure 2:
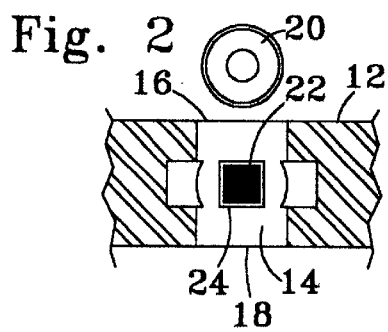
FIG. 2 illustrates a side sectional view of a housing and opening.

The invention provides a unique apparatus and method for retaining batteries and for permitting the quick replacement of batteries in electronic devices such as game controllers. Referring to FIG. 1, portable device or controller 10 is formed with housing 12 having opening 14. Controller 10 can incorporate electrical or electronic components for performing selected functions. As shown in FIG. 2, opening 14 has first aperture 16 and second aperture 18 which are sufficiently large to permit the entry of battery 20 into opening 14. Retainer means such as electrical contacts 22 and 24 are attached to housing 12 within opening 14 for engaging and for retaining battery 20 in a stationary position relative to housing 12. Electrical contacts 22 and 24 can also provide the function of providing electrical contact with positive and negative terminals of battery 20, however the primary function of electrical contacts 22 and 24 as a retainer means is to provide engagement between battery 20 and housing 12. Such retainer means can comprise a clip, latch, flexible cord, clearance fit, or other structural or mechanical combination of elements sufficient to retain battery 20 stationary relative to housing 12. In other embodiments of the invention, the electrical contacts and device for retaining battery 20 can be separate from a retainer means for gripping battery 20.

The term "opening" as used herein describes an open space serving as a passage for the movement of batteries. Opening 14 provides a passage for permitting the movement of battery 20 therethrough, and can be straight, curved, or irregular in shape. Although opening 14 is illustrated in FIGS. 1 and 2 as a substantially straight passage within housing 12, opening 14 could bend at different angles so that second aperture 18 is not perpendicular with first aperture 16 as shown in FIG. 3.

Figure 3:
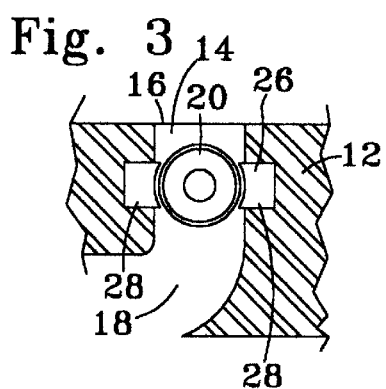
FIGS. 3 and 4 illustrate a retainer mechanism for engaging and for permitting disengagement of a battery.
Figure 4:
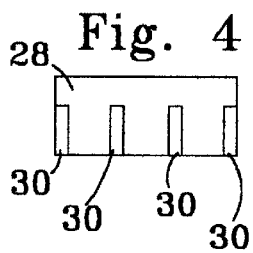

FIG. 3 illustrates one embodiment of the invention wherein retainer means 26 holds battery 20 relative to housing 12. Retainer means 26 can comprise an electrical contact as shown in FIG. 2 and can be formed with flexible tabs 28 each having one or more fins 30 as shown in FIG. 4. Tabs 28 can be molded directly into different portions of housing 12, and one or more tabs 28 can retain battery 20 and ensure the proper orientation of battery 20 relative to housing 12 and to electrical contacts 22 and 24.

Figure 5:
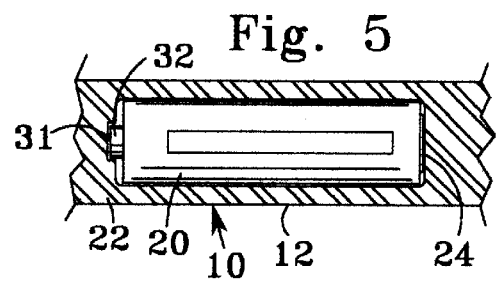
FIG. 5 illustrates a slot for orienting a battery within a housing and further illustrates a detent for activating a charge strip.

Opening 14 permits battery 20 to be observed at all times during operation of controller 10. If battery 20 is formed with a strip indicating the charge status of the battery as shown in FIG. 5, opening 14 permits visual contact with such charge strip indicator. Batteries having a charge strip typically require depression of such strip element to activate operation of the charge strip. To automatically accomplish this function, spring-loaded detent 31 can be integrated with housing 12 as shown in FIG. 5.

Although opening 14 is not closed to dirt and other contaminants in the environment around controller 10, opening 14 can be formed in such a way that discontinuities for trapping dirt are not present. By molding housing 12 in two fitted components, housing 12 is easily manufactured and provides a smooth, continuous interior surface forming opening 14. This combination of second aperture 18 with first aperture 16 within opening 14 permits dirt and other contaminants to be flushed through opening 14 without accumulating within a recess or compartment, in contrast with conventional battery compartments requiring a contamination-proof door or cover.

Although battery 20 is illustrated in a preferred embodiment as being recessed completely within an exterior surface of housing 12, the retaining means could hold battery 20 partially or wholly outside of housing 12 exterior surface. The interior placement is preferred because battery 20 is protected from accidental contact and can be insulated from vibrations which might damage electrical contacts 22 or dislodge battery 20 from engagement with electrical contacts 22. A single battery 20 is illustrated in stationary contact relative to electrical contacts 22, however more than one battery 20 can be stacked in different orientations within opening 14.

As shown in FIGS. 1 and 5, opening 14 can be oriented with slot 32 to provide a polarized shape for battery 20. If the controller 10 requires one or more AA batteries having standard positive and negative terminals, slot 32 can be configured to permit the proper insertion of battery 20 through opening 14. This feature of the invention prevents battery 20 from being inserted backwards into opening 14, and prevents accidental, improper contact between the terminals of battery 20 and electrical contacts 22 and 24. Accordingly, slot 32 provides a safety feature for preventing accidental damage to electronic components within controller 10.

Figure 6:
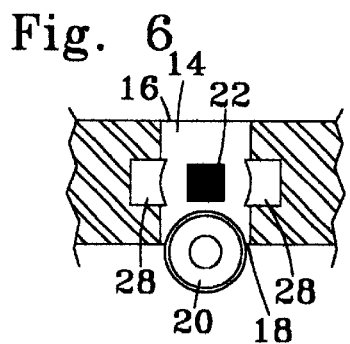
FIG. 6 illustrates the displacement of a battery from the housing opening.

To remove battery 20 from opening 14, battery 20 is pushed through either first aperture 16 or through second aperture 18 as shown in FIG. 6. During such movement, electrical contacts 22 and 24 are cleaned as the positive and negative terminals of battery 20 slide relative to electrical contacts 22 and 24. This movement automatically cleans electrical contacts 22 and 24 without requiring separate attention, and further permits electrical contacts 22 and 24 to be cleaned in a single direction across the entire face of electrical contacts 22 and 24. Any contact wear and cleaning efficiency is uniform because of the linear movement of the battery 20 terminals relative to electrical contacts 22 and 24.

Electrical contacts 22 and 24 can be elongated along the length of opening 14 between first aperture 16 and second aperture 18 to provide a make or break function. This feature permits a replacement battery such as battery 34 to engage electrical contacts 22 and 24 before discharged battery 20 is removed from housing 12. Suitable electronic components can be provided to regulate electrical current during the exchange of battery 20. For example, diodes can prevent replacement battery from transmitting energy into discharged battery 20 in higher voltage batteries.

In one embodiment of the invention, a brief power interruption occurs and electronics within controller 10 bridge the split second power outage during battery exchange. This feature is desirable because controller 10 does not simultaneously engage two batteries (such as a nearly discharged battery and a fully charged battery) in parallel. The temporary condition of two batteries in parallel could cause leakage or explosion of the discharged battery unless electronics for addressing multiple battery contact was provided. In another embodiment of the invention, make before break electronics can be provided so that power interruption does not occur. In another embodiment of the invention, two pairs of electrical contacts 22 and 24 can be provided, and electronics within controller 10 can prevent cross contact between battery 20 and battery 34 during exchange procedures.

Figure 7:
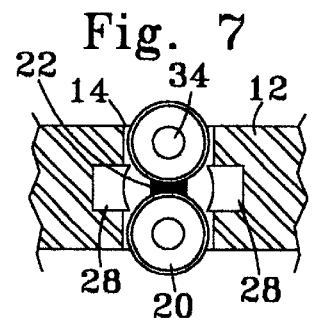
FIG. 7 illustrates a second battery displacing a discharged battery.

FIG. 6 illustrates the displacement of battery 20 from engagement with retainer means such as electrical contacts 22. Battery 20 can be dislodged from such engagement with a person's finger or by the insertion of an object into contact with battery 20. FIG. 7 illustrates another embodiment of the invention wherein a second, charged replacement battery 34 is moved into first aperture 16 and into contact with the original discharged battery 20 in contact with electrical contacts 22 and 24. As the replacement battery 34 is moved through opening 14, the discharged battery 20 is displaced from opening 14 and replacement battery 34 is moved into engagement with electrical contacts 22 and 24 and with tabs 28.

Battery 20 is insertable into opening 14 through either first aperture 16 or through second aperture 18. This feature of the invention provides unique flexibility in the construction and use of housing 12 by permitting operation and battery 20 exchange from more than one side of housing 14. This design also provides unique flexibility in the design and construction of housing 12. Housing 12 can be molded in a single piece or in two or more pieces connectable with snap fittings or other conventional fastening systems. This design flexibility significantly simplifies manufacture, assembly, and repair of controller 10.

Figure 8:
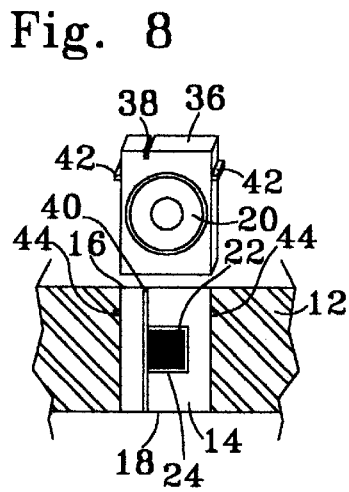
FIG. 8 illustrates a cartridge for insertion into the housing opening.

Access to battery 20 is unobstructed through first aperture 16 or second aperture 18. This feature of the invention permits battery 20 to be displaced from opening 14 in either direction through first aperture 16 or through second aperture 18. Additionally, this feature of the invention permits battery 20 to be displaced from opening 14 in many different ways. Battery 20 can be displaced from opening 14 with a person's finger, with contact from another battery 20 moving through opening, or with another object urged against battery 20. In other embodiments of the invention, battery 20 can be carried by a case such as cartridge 36 insertable through opening 14 as shown in FIG. 8. Cartridge 36 can carry one or more batteries, and can be integrated within battery 20. Cartridge 36 can be configured to enter first aperture 16 and to exit second aperture 18, or vice versa. Cartridge 36 can have slot 38 engagable with key 40 for aligning the electrodes of battery 20 with electrical contacts 22 and 24. Ribs 42 engageable with recesses 44 can temporarily retain cartridge 36 within opening 14.

Figure 9:
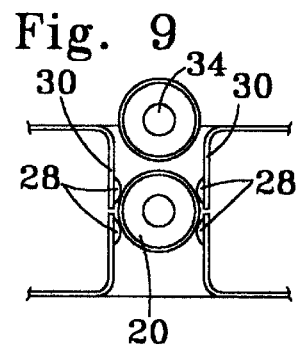
FIGS. 9 and 10 illustrate a sequence for replacing a battery in a housing having flexible retainer means for gripping the batteries.
Figure 10:
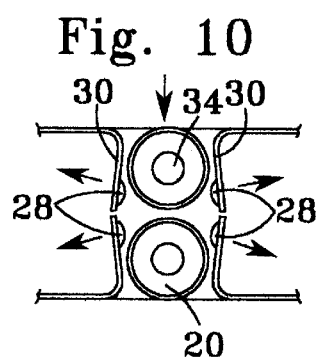

FIGS. 9 and 10 show a sequence of battery 34 displacing battery 20 in contact with fins 30 and flexible tabs 28. Fins 30 directly contact battery 20 for retaining battery 20 in the proper place as shown in FIG. 9. The natural molded-in position of tabs 28 provides a spring loaded feature for retaining battery 20. As battery 34 is moved into contact with battery 20, tabs 28 move outwardly as shown in FIG. 10. When battery 34 is retained by tabs 28 and fins 30, tabs provide a restoring force for gripping battery 34. By rounding the bases for tabs 28, additional flexure is provided to provide a gripping force against battery 20 or replacement battery 34. The material used for tabs 28 can comprise ABS or PVC plastic or a composite, metallic, or other suitable material. The material used will affect the tab base curve radius, tab thickness, and height of fins 30. Although FIGS. 9 and 10 illustrate one technique for using tabs 28 and fins 30 as retainer means, many other forms and combinations of components can accomplish the inventive function of temporarily retaining a battery stationary to housing 12.

Movement of battery 20 through opening 14 cleans electrical contacts 22 each time that battery 20 is exchanged with a new replacement battery 34. Instead of using compartment doors or panels to prevent dirt and other contaminants from entering the battery compartment, the invention provides an unobstructed opening 14 for permitting passage of dirt completely through housing 12. Any dirt contamination of electrical contacts 22 is contact wiped clean during battery 20 replacement, thereby providing a self cleaning function for the invention. This wiping function removes contaminants and oxidation from contact points, and potentially creates a molecular bond between metals resistant to contamination and oxidation.

The invention significantly decreases the time necessary to exchange batteries 20, thereby providing substantial improvement over the prior art in the operator time taken away from operation of controller 10. This feature of the invention is particularly useful in game controllers wherein split second operation substantially affects the game performance. Opening 14 provides unobstructed exchange operation, and eliminates covers and moving doors subject to breakage and jamming in the excitement of game operation.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A portable battery operated apparatus for permitting replacement of a battery having positive and negative terminals, comprising:

a housing;

an opening in said housing having a first aperture and a second aperture, wherein said first and second apertures are sufficiently large to permit movement of the battery therethrough and wherein said battery is moveable into said opening through said first aperture and through said second aperture; and retainer means engaged with said housing for holding the battery in a selected position relative to said opening, wherein the battery is accessible through said opening for permitting displacement of the battery from said opening.

2. An apparatus as recited in claim 1, wherein the battery is insertable through said first aperture into engagement with said retaining means, and wherein said battery is displaceable through said second aperture.

3. An apparatus as recited in claim 1, wherein the battery is completely contained within said opening and does not extend outside of said housing when said retainer means holds said battery.

4. An apparatus as recited in claim 1, wherein the battery is displaceable from said retainer means by contact with another battery moving through said opening.

5. An apparatus as recited in claim 1, wherein said retainer means comprises electrical contacts for engagement with the battery terminals.

6. An apparatus as recited in claim 5, wherein said electrical contacts are engaged with the battery terminals as the battery is moved through said opening.

7. A portable, battery operated apparatus for permitting replacement of a battery having a charge indicator strip and having positive and negative terminals, comprising:

a housing;

an opening in said housing having a first aperture and a second aperture, wherein said first and second apertures are sufficiently large to permit movement of the battery therethrough;

retainer means engaged with said housing for holding the battery in a selected position relative to said opening, wherein the battery is accessible through said opening for permitting displacement of the battery from said opening; and means engaged with said housing for activating the battery charge indicator strip.

8. A portable apparatus having electronic components powered by a battery, comprising;

a housing:

an opening in said housing having a first aperture and a second aperture, wherein said first and second apertures are sufficiently large to permit movement of the battery therethrough:

battery contacts within said opening for engaging the battery; and a cartridge for carrying the battery which is insertable into said opening for restraining the battery in engagement with said battery contacts and for releasably permitting the battery to be displaced from said opening.

9. An apparatus as recited in claim 8, wherein said electrical contacts are engaged with the positive and negative terminals of the battery as the battery is moved through said opening.

10. An apparatus as recited in claim 9, wherein the battery is displaceable from said opening by another battery moving through said opening.

* * * * *